(12) United States Patent
Stone et al.

(10) Patent No.: US 11,216,727 B2
(45) Date of Patent: Jan. 4, 2022

(54) SYSTEM AND METHOD FOR TEACHING COMPOSITIONALITY TO CONVOLUTIONAL NEURAL NETWORKS

(71) Applicant: Vicarious FPC, Inc., Union City, CA (US)

(72) Inventors: Austin Charles Stone, Union City, CA (US); Huayan Wang, Union City, CA (US); D. Scott Phoenix, Union City, CA (US); Dileep George, Union City, CA (US)

(73) Assignee: Vicarious FPC, Inc., Union City, CA (US)

( * ) Notice: Subject to any disclaimer, the term of this patent is extended or adjusted under 35 U.S.C. 154(b) by 584 days.

(21) Appl. No.: 16/221,104

(22) Filed: Dec. 14, 2018

(65) Prior Publication Data

US 2019/0122112 A1    Apr. 25, 2019

Related U.S. Application Data

(63) Continuation of application No. 15/803,595, filed on Nov. 3, 2017, now Pat. No. 10,185,914.

(60) Provisional application No. 62/417,168, filed on Nov. 3, 2016.

(51) Int. Cl.
| | |
|---|---|
| *G06N 3/08* | (2006.01) |
| *G06N 3/04* | (2006.01) |
| *G10L 15/16* | (2006.01) |
| *G06K 9/62* | (2006.01) |
| *G06K 9/46* | (2006.01) |

(52) U.S. Cl.
CPC ............. *G06N 3/08* (2013.01); *G06K 9/4628* (2013.01); *G06K 9/627* (2013.01); *G06K 9/6256* (2013.01); *G06K 9/6268* (2013.01); *G06N 3/04* (2013.01); *G06N 3/0454* (2013.01); *G10L 15/16* (2013.01)

(58) Field of Classification Search
None
See application file for complete search history.

(56) References Cited

U.S. PATENT DOCUMENTS

| | | |
|---|---|---|
| 2016/0019459 A1 | 1/2016 | Audhkhasi et al. |
| 2016/0174902 A1 | 6/2016 | Georgescu et al. |
| 2016/0358337 A1 | 12/2016 | Dai et al. |
| 2017/0323481 A1 | 11/2017 | Tran et al. |
| 2018/0032846 A1 | 2/2018 | Yang et al. |

OTHER PUBLICATIONS

"Dai Jifeng; et al., Convolutional Feature Masking for Joint Object and Stuff Segmentation, 2015, IEEE, pp. 3992-4000.", Mar. 20, 2018 00:00:00.0.

*Primary Examiner* — Alan Chen
(74) *Attorney, Agent, or Firm* — Jeffrey Schox; Diana Lin

(57) ABSTRACT

A system for teaching compositionality to convolutional neural networks includes an unmasked convolutional neural network comprising a first set of convolutional neural network layers; a first masked convolutional neural network comprising a second set of convolutional neural network layers; the unmasked convolutional neural network and the first masked convolutional network sharing convolutional neural network weights; the system training the unmasked and first masked convolutional neural networks simultaneously based on an objective function that seeks to reduce both discriminative loss and compositional loss.

20 Claims, 6 Drawing Sheets

SYSTEM AND METHOD FOR TEACHING COMPOSITIONALITY TO CONVOLUTIONAL NEURAL NETWORKS

CROSS-REFERENCE TO RELATED APPLICATIONS

This application is a continuation of U.S. patent application Ser. No. 15/803,595, filed 3 Nov. 2017, which claims the benefit of U.S. Provisional Application Ser. No. 62/417,168, filed on 3 Nov. 2016, both of which are incorporated in their entirety by this reference.

TECHNICAL FIELD

This invention relates generally to the artificial intelligence field, and more specifically to new and useful systems and methods for teaching compositionality to convolutional neural networks.

BACKGROUND

Despite advances in computer vision, image processing, and machine learning, recognizing visual objects remains a task where computers fail in comparison with the capabilities of humans. Recognizing an object from an image not only requires recognizing the object in a scene but also recognizing objects in various positions, in different settings, and with slight variations. For example, to recognize a chair, the innate properties that make a chair a chair must be understood. This is a simple task for a human. Computers struggle to deal with the vast variety of types of chairs and the situations in which a chair may be present. Models capable of performing visual object recognition must be trained to provide explanations for visual datasets in order to recognize objects present in those visual datasets. Unfortunately, most methods for training such models either fall short in performance and/or require large training sets.

This issue is not confined solely to visual object recognition, but more generally applies to pattern recognition, which may be used in speech recognition, natural language processing, and other fields. Thus, there is a need in the artificial intelligence field to create new and useful systems and methods for teaching compositionality to convolutional neural networks.

DESCRIPTION OF THE INVENTION EMBODIMENTS

The following description of the invention embodiments of the invention is not intended to limit the invention to these invention embodiments, but rather to enable any person skilled in the art to make and use this invention.

1. Neural Networks and Related Systems

Neural networks and related systems, including recursive cortical networks (RCNs), convolutional neural networks (CNNs), hierarchical compositional networks (HCNs), HMAX models, Slow Feature Analysis (SFA) systems, and Hierarchical Temporal Memory (HTM) systems may be used for a wide variety of tasks that are difficult to complete using standard rule-based programming. These tasks include many in the important fields of computer vision and speech recognition.

Neural networks and related systems can be represented as distributed processing elements that implement summation, multiplication, exponentiation or other functions on the elements incoming messages/signals. Such networks can be enabled and implemented through a variety of implementations. For example, a system may be implemented as a network of electronically coupled functional node components. The functional node components can be logical gates arranged or configured in a processor to perform a specified function. As a second example, the system may be implemented as a network model programmed or configured to be operative on a processor. The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

In particular, convolutional neural networks (CNNs) may be useful for performing inference on data for which feature recognition is independent of one or more dimensions of the data; for example, when detecting shapes in an image, the detected shapes are not dependent on their position in the image—the same features used to detect a square in one part of the image may be used to detect a square in another part of the image as well. These dimensions may be spatial (as in the 2D image example), but may additionally or alternatively be temporal or any suitable dimensions (e.g., a frequency dimension for audio or multispectral light data).

Figure 1A:
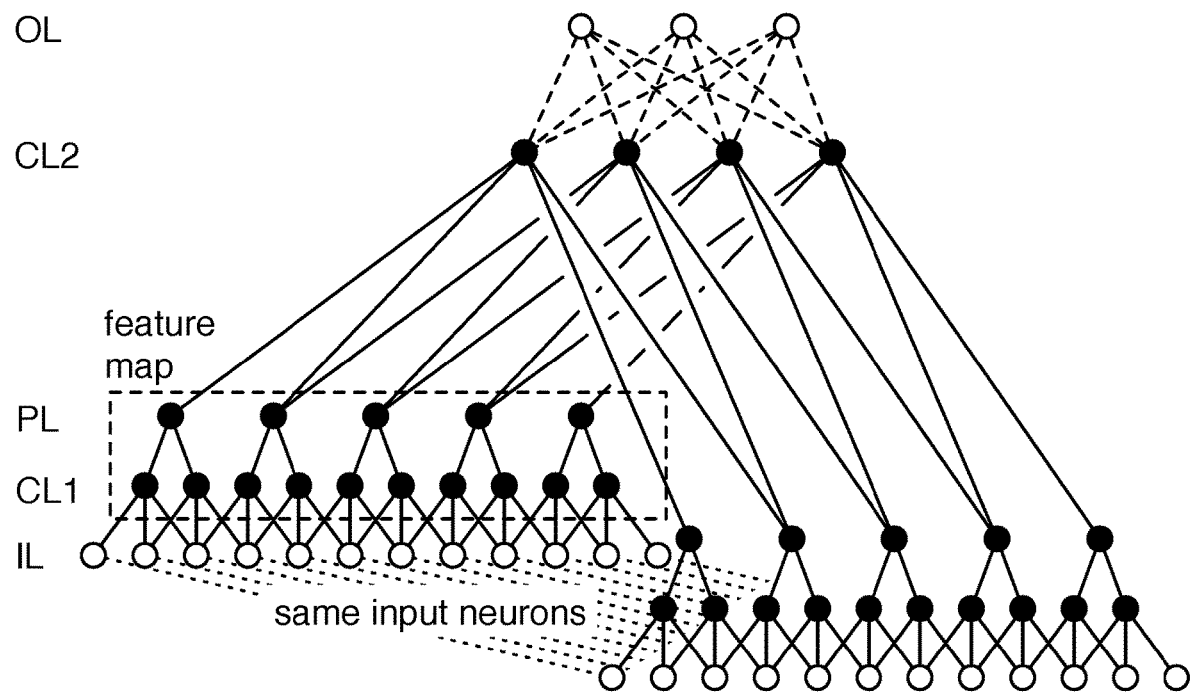
FIG. 1A is an example diagram view of a convolutional neural network.
Figure 1B:
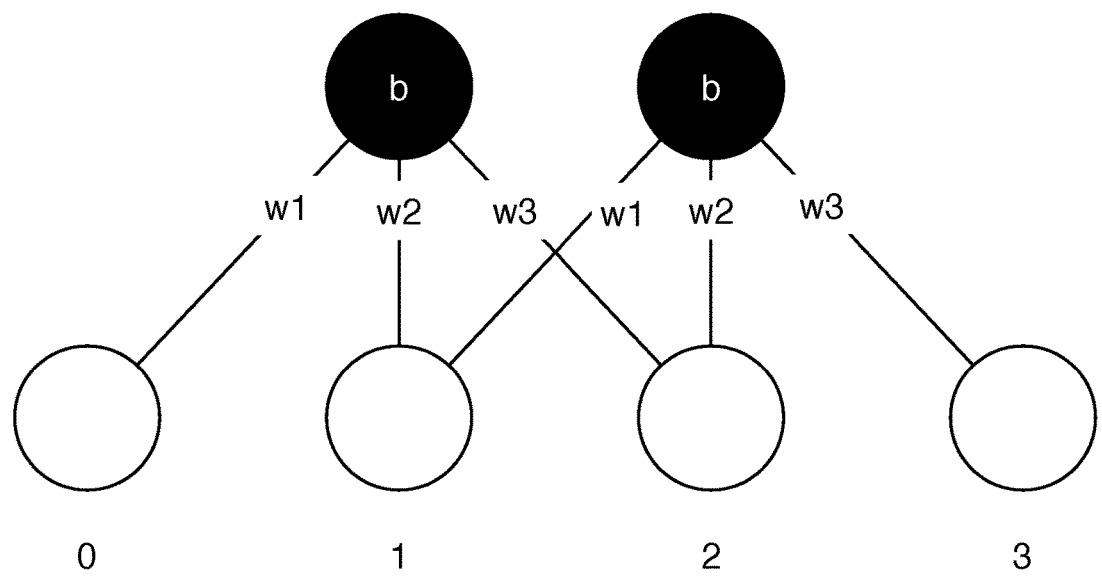
FIG. 1B is an example diagram view of weights of a convolutional neural network.

CNNs, as shown in FIG. 1A, take advantage of the dimensional structure of data by connecting neurons only to a small region of input data, selected using the previously mentioned dimensionality of the data. These regions are referred to as local receptive fields. A set of neurons, each neuron connected to a receptive field of neurons below it, as well as the output of that set of neurons, is referred to as a feature map. In a CNN, feature maps are unique in that they have shared weights; that is, each neuron of a given feature map (which corresponds to the same feature, but shifted across the data dimensions) is constrained to have the same input weights and biases as the other neurons of that feature map, as shown in FIG. 1B. Of course, it is often desirable for a given layer to have multiple feature maps (each able to correspond to a different feature). The layer containing the multiple feature maps is referred to as a convolutional layer (so called because the output of a neuron in the layer is a convolution operation performed on the inputs).

CNNs may also include pooling layers, which function to reduce the size of the output of a set of neurons (typically the output of a convolutional layer, but pooling layers may be used for any set of neurons; e.g., on top of the input neurons). For example, a pooling layer may take the maximum activation of a set of neurons as an output (i.e., max-pooling). Pooling layers are applied to each feature map separately. Commonly, pooling layers are used between convolutional layers in CNNs. CNNs also may include other layers, such as input layers, output layers, etc.

As shown in FIG. 1A, an example CNN includes an input layer IL, a first convolutional layer CL1, a pooling layer PL, a second convolutional layer CL2, and an output layer OL. The input neurons in the input layer are connected to two feature maps in CL1 (note that while two sets of input neurons are shown, this is for display purposes only—the neurons of the first feature map and of the second feature map are connected to the same input neurons). As shown, CL1 has a receptive field of 3.

Each feature map is in turn connected to a set of pooling neurons in PL. As shown, PL has a pooling window of 2.

The output of PL is used as an input to the second convolution layer CL2, which has a receptive field of 2. Note here that each neuron of CL2 connects to each feature map of CL1/PL; in other words, the feature map of CL2 (there is only one as shown in FIG. 1A) is a combination of all feature maps in CL1. This is typical of CNNs; generally, in a CNN, all feature detectors in a convolutional layer have access to all features from the previous convolutional layer.

Finally, the output of CL2 is used as input to the output layer OL. Note here that OL is fully connected to CL2.

By limiting neural network connections via exploiting the locality of the receptive fields according to data dimensionality, CNNs can perform inference with a fraction of the complexity required by an older fully-connected model.

Nevertheless, typical CNNs fail to exhibit significant compositionality; i.e., the preference that the representation of part of a dataset should be similar to the corresponding part of the representation of the dataset. For example, a neural network performing object recognition on image data ideally recognizes objects regardless of their context (e.g., other objects in the image, background). In typical CNNs, this is not the case—the activations corresponding to the region surrounding a first object are significantly affected by changes in background or the presence of nearby objects.

The system and method of an invention embodiment function to teach compositionality to CNNs (resulting in enhanced-compositionality CNNs). The system and method do so not by explicitly modifying the structure of the CNNs, but rather by using unique and novel techniques to modify CNN training objectives and therefore bake compositionality into the CNNs during training. This is distinct from past approaches designed to create compositional neural networks, which generally mandate a particular network architecture or parameterization.

As described previously, compositionality is the preference that the representation of part of a dataset should be similar to the corresponding part of the representation of the dataset. A formal definition of compositionality for an image dataset is as follows.

Let X be an image, m a binary mask that identifies part of X (i.e, m is a tensor of the same shape as X with is indicating part affiliation), $\varphi$ a mapping from an image onto an arbitrary feature layer of a CNN, and p the projection operator onto the feature map represented by $\varphi$. Then, we define $\varphi$ to be compositional iff the following equality holds:

$$\varphi(m \cdot X) = p(m) \cdot \varphi(X)$$

Here, the · operator represents element-wise multiplication. The projection operator, p, down-samples the object mask to the size of the output of $\varphi$. For instance, if $\varphi(X)$ is the activations of a convolutional layer and has size (x, y, c) (where the first two dimensions are spatial and c is the number of feature channels), p will down-sample the object mask to size (x, y) and then stack c copies of the down-sized object mask on top of each other to produce a mask of size (x, y, c).

Note that we do not require the preceding equation to hold for all possible masks m, as this would constrain $\varphi$ to be the identity map. Instead, we apply the inductive bias selectively to image parts that we would like to be treated as a unit—obvious choices include objects, object parts, or image regions that carry certain attributes.

2. System for Teaching Compositionality to CNNs

Figure 2A:
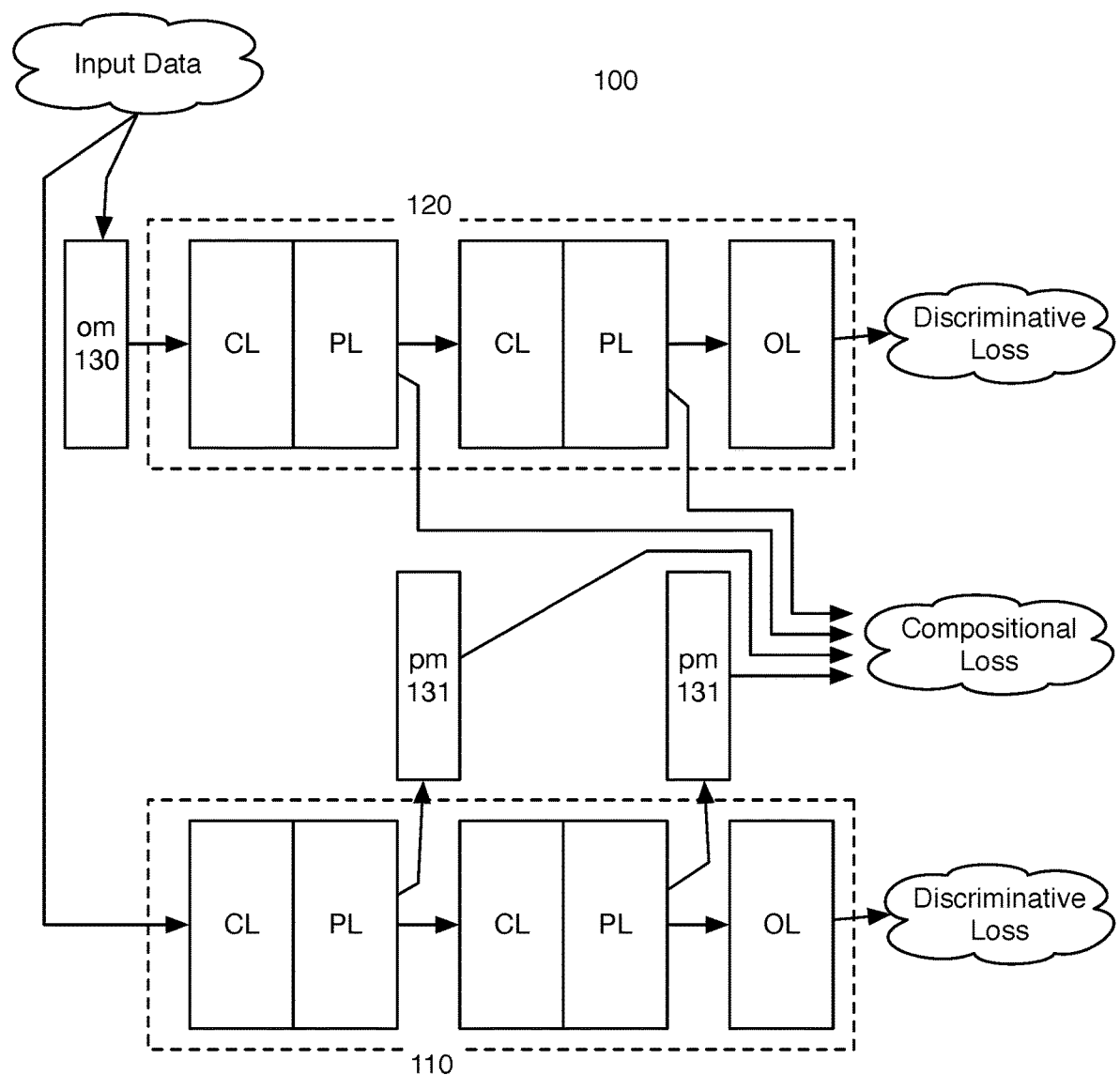
FIG. 2A is a diagram view of a system of an invention embodiment.
Figure 2B:
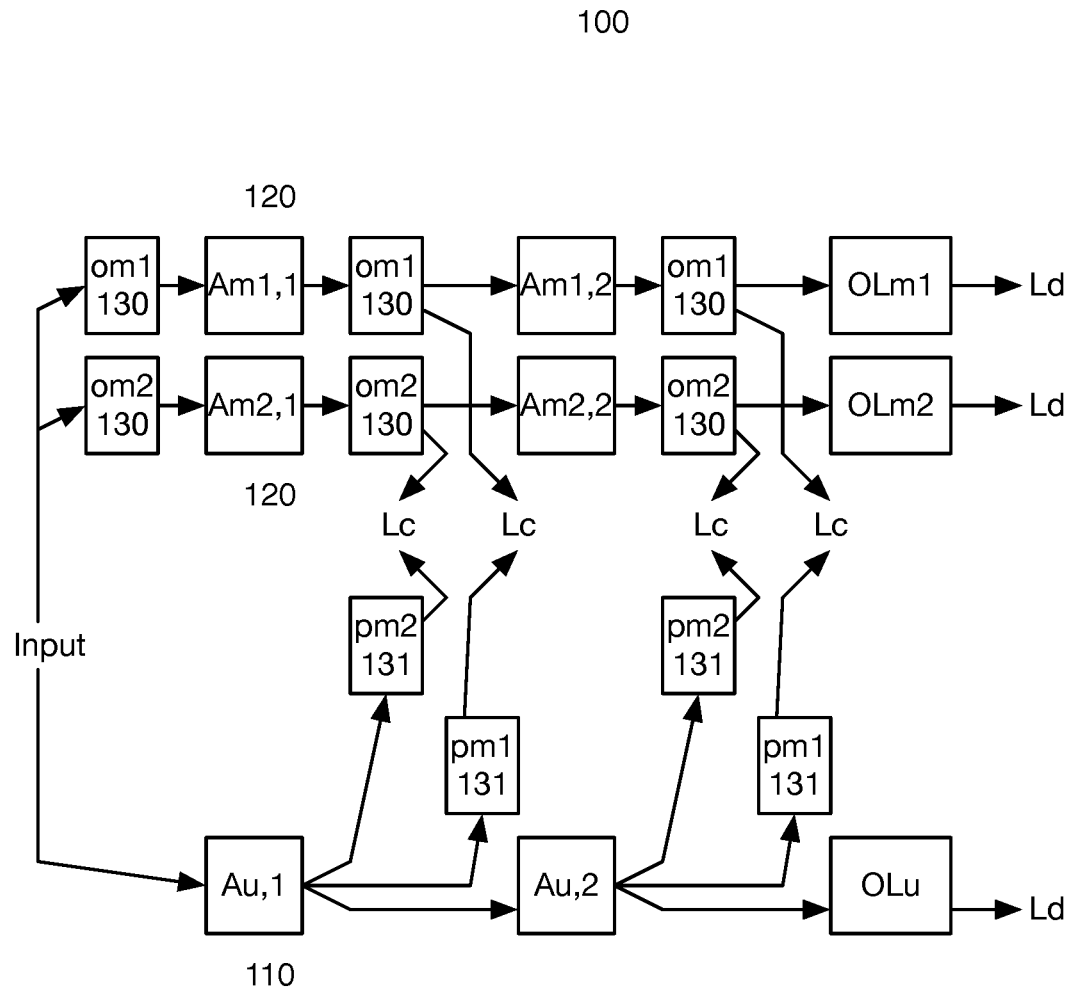
FIG. 2B is a diagram view of a system of an invention embodiment.

A system 100 for teaching compositionality to CNNs includes an unmasked CNN 110, a masked CNN 120, an object mask 130, and a penalty mask 131, as shown in FIGS. 2A and 2B.

The system 100 functions to train a CNN (the unmasked CNN no) for both discrimination and compositionality using one or more masked CNNs 120. The masked CNNs 120 are similar to the unmasked CNN 110 (and in fact share weights with the CNN no), but include an object mask 130 at their inputs (and potentially at intermediate locations as well). The object mask 130 for a given masked CNN 120 masks input to filter out data except that which corresponds to a particular object (e.g., by selecting a region containing the object). Penalty masks 131 function similarly, but are used for calculating compositional loss (i.e., activations of unmasked networks may be masked for comparison to outputs of masked networks, but this masking is used only for such comparison and does not directly affect the activations transmitted from layer to layer in the unmasked network 110).

The system 100 preferably trains the unmasked CNN 110 using an objective function that attempts to minimize (or otherwise reduce) both discriminative loss and compositional loss. Such training is discussed in greater detail in the section on the method 200, which the system 100 preferably uses to accomplish CNN training. The system 100 may additionally or alternatively be trained in any manner (e.g., via stochastic gradient descent). Training data may be any set of data; e.g., images, video, audio, speech, medical sensor data, natural language data, financial data, application data, traffic data, environmental data, etc.

Note that the system 100 may include a single unmasked CNN 110 and a single masked CNN 120 (as in FIG. 2A) or a single unmasked CNN no and multiple masked CNNs 120 (as in FIG. 2B). For example, the system 100 may include a number of masked CNNs 120 equivalent to the number of objects in a set of training data.

The unmasked CNN 110 is a CNN without any masks intermediate to its layers (in other words, a standard CNN), with the exception that the unmasked CNN 110 may include connections at one or more layers to penalty masks 131.

The unmasked CNN no may be any type of CNN. For example, the unmasked CNN 110 may include alternating convolutional and pooling layers (eventually coupled to an output layer), as in FIG. 2A. Additionally or alternatively, the unmasked CNN 110 may include any number of CNN layers of any type and in any order.

The masked CNN 120 is preferably substantially similar to the unmasked CNN 110, except that input to the masked CNN 120 is masked by an object mask 130 (as shown in FIGS. 2A and 2B). The masked CNN 120 may include any number of object masks 130. For example, as in FIG. 2B, a masked CNN 120 may include object masks between layers of the masked CNN 120 (which prevents a layer from the CNN from erroneously propagating activations that occur outside of a region defined by the object mask 130. Note that as shown in FIG. 2B each displayed layer of the CNNs 110 and 120 (referenced as Am) includes both pooling and convolutional layers (while the OL layers represent fully connected output layers).

Note that the unmasked CNN 110 and the masked CNNs 120 preferably share weights, constraining the training process.

The object mask 130 functions to filter the input to and/or output of layers of the masked CNNs 120. The object mask 130 is preferably a binary mask applied to a region (e.g., a spatial region, a temporal region, a spatiotemporal region, or any other way of examining a region within a dataset) containing a particular object. For example, if an image includes a cup sitting on a table, the region containing the cup may contain is (i.e., allowing activations in that region to pass) while the region containing the table and the background of the image (and any other objects) may contain zeros (i.e., blocking activations in that region). While the object mask 130 is referred to as a mask (due to potential applications in image categorization) it is understood that the object mask 130 may be any filter that suppresses activations outside of a region containing an object.

The object mask 130 is preferably present at the input to masked CNNs 120, but may additionally or alternatively be present in any location (e.g., between layers of masked CNNs 120).

Figure 3A:
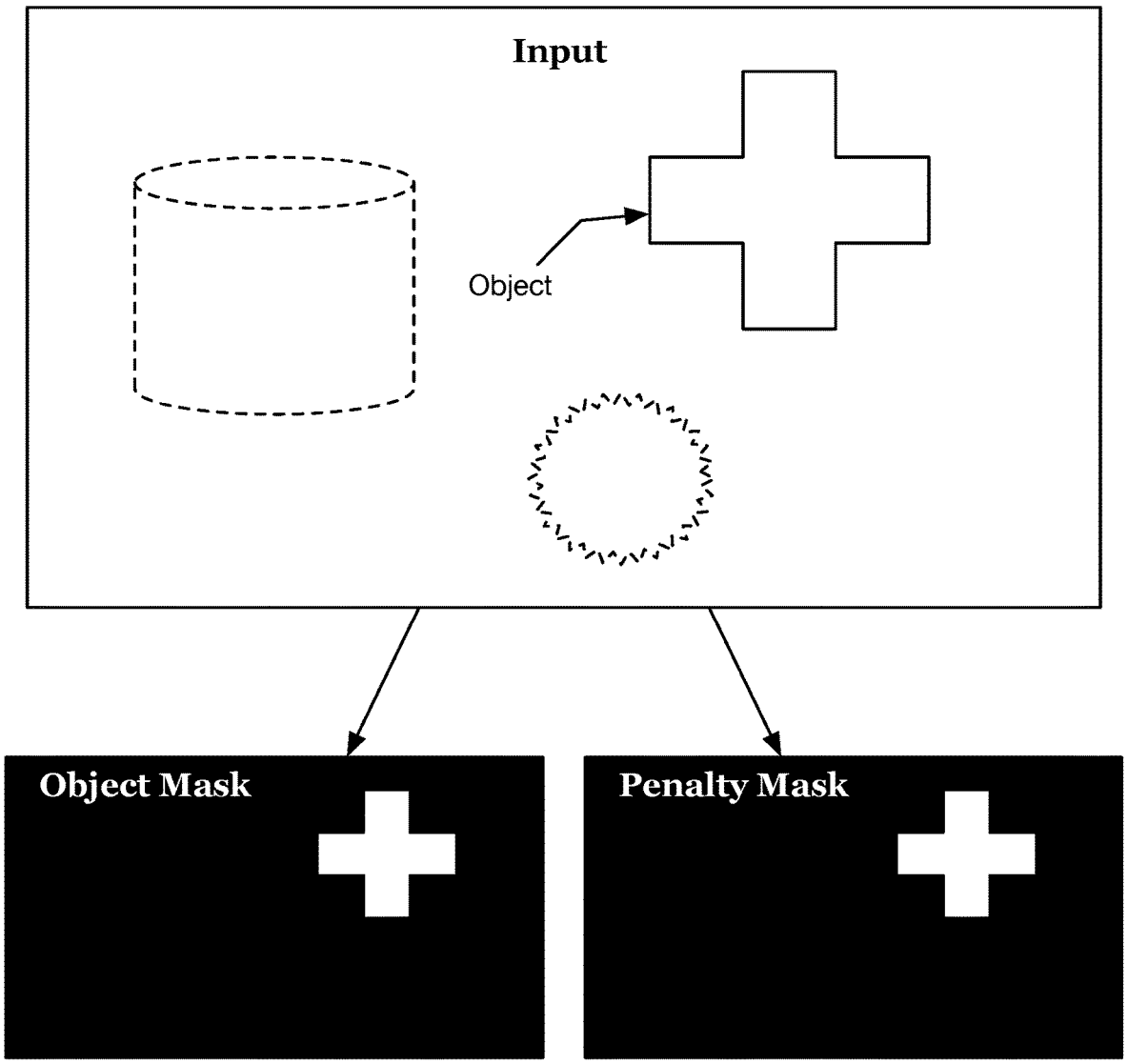
FIG. 3A is an example view of a first penalty mask generation scheme.

In one implementation of an invention embodiment, the penalty mask 131 is preferably substantially similar to the object mask 130, except that the penalty mask 131 is used to filter output of layers of the unmasked CNN 110 (such filtering enabling the comparison of layer output from the unmasked CNN 110 to that of masked CNNs 120). In this implementation, shifts in activation in the region of the object for a given penalty mask 131/object mask 130 pair are penalized, but background activations are not (because they are filtered out by the penalty mask 131). An example of this implementation is as shown in FIG. 3A.

Figure 3B:
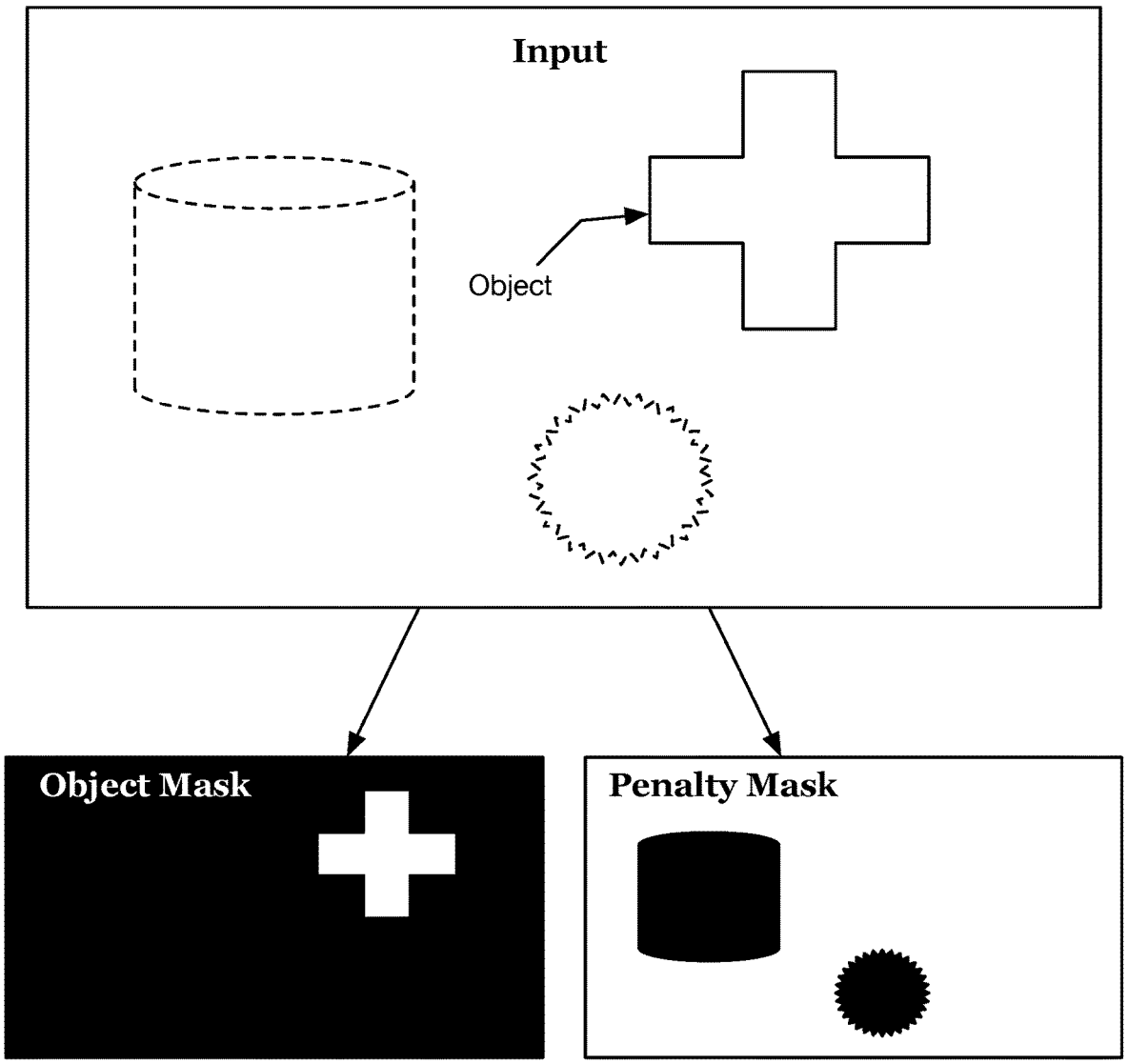
FIG. 3B is an example view of a second penalty mask generation scheme.

In a second implementation of an invention embodiment, the penalty mask 131 is similar to the object mask 130, except that activations in the background (i.e., area of the dataset where no object regions are defined) are passed by the penalty mask 131 in addition to activations in the region of a given object. In this implementation, both positional shifts in activation in the object region and background activations are penalized. An example of this implementation is as shown in FIG. 3B.

3. Method for Teaching Compositionality to CNNs

Figure 4:
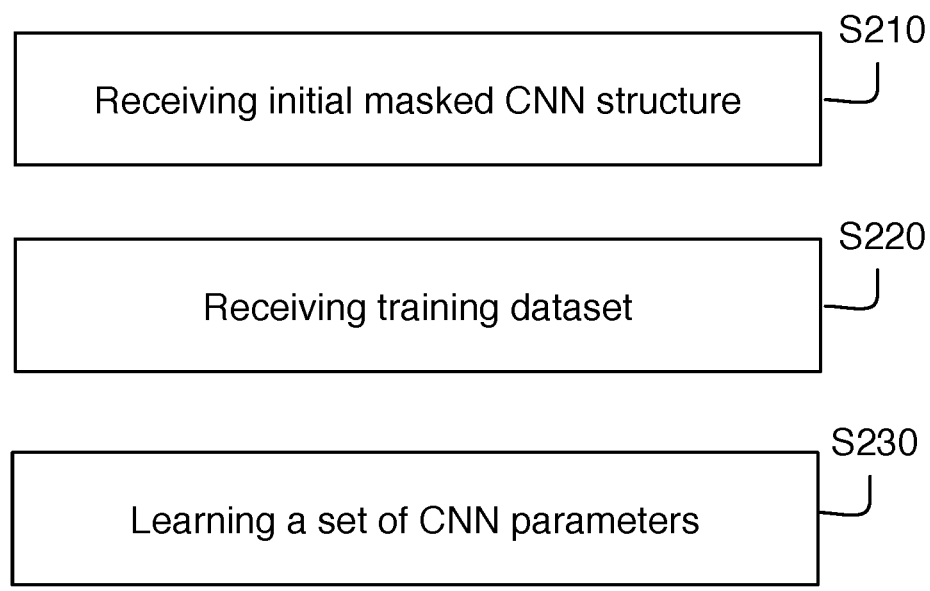
FIG. 4 is a chart view of a method of an invention embodiment.

A method 200 for teaching compositionality to CNNs includes receiving an initial masked CNN structure S210, receiving a training dataset S220, and learning a set of CNN parameters S230, as shown in FIG. 4.

The method 200 functions to set tunable parameters of a CNN such that the CNN is trained to perform data inference based on a set of data used to train the CNN (i.e., the training dataset received in S220).

The method 200 is preferably implemented on the system 100, but may additionally or alternatively be implemented by any neural network capable of implementing the steps of the method 200. The method 200 is preferably implemented by a computing system (e.g., computer, distributed computing system, etc.).

S210 includes receiving an initial masked CNN structure. S210 preferably includes receiving information describing the structure of an unmasked CNN—e.g., data that specifies the neurons of the unmasked CNN and their connections (e.g., layer type and order, connections between layers, etc.). This information may be specified in a number of forms; for example, CNN structure may be specified by specifying each variable node and factor node and their connections. S210 preferably additionally includes receiving information describing masked CNNs (corresponding to the unmasked CNNs) as well as object and penalty masks (e.g., location, mask definition, etc.).

Alternatively, CNN structure may be specified relying on known structural rules (e.g., a two-layer CNN, each layer containing a convolutional sub-layer and a pooling sub-layer, connections specified by stated pooling windows and receptive fields). CNN structure information may include any CNN structural or parametric information described in the section on the system 100 as well as any additional information that may be used in the course of the method 200.

S210 may additionally include receiving hyperparameters of the CNNs (discussed in S230).

S220 includes receiving a training dataset. S220 functions to receive a set of training data (henceforth referred to as X). The set of training data preferably includes multiple elements (e.g., $\{X_n\}_{n=1}^{N}$); for example, each element may correspond to a different training image of an image dataset. Training data may additionally include corresponding classifying information; for example, a dataset may include a set of labels C: $\{X_n, C_n\}_{n=1}^{N}$.

Accordingly, training data may be unlabeled, partially labeled, or fully labeled. Likewise, training data may be complete (e.g., information is provided for each input neuron of the CNN) or incomplete (e.g., information is not provided for all input neurons).

Training data may be any set of data for which inference or generation is desired; e.g., images, video, audio, speech, medical sensor data, natural language data, financial data, application data, traffic data, environmental data, etc.

S230 includes learning a set of CNN parameters. S230 functions to learn values for tunable parameters of the CNN based on the training dataset (allowing the CNN to perform inference for data objects similar to those the CNN is trained on). These tunable parameters are preferably chosen by attempting to minimize an objective function that takes into account both discriminative loss and compositional loss. Additionally or alternatively, the tunable parameters may be chosen in any manner.

Tunable parameters are preferably set by attempting to minimize the objective function using a stochastic gradient descent algorithm, but may additionally or alternatively be set in any manner.

In one example implementation of an invention embodiment, S230 includes attempting to minimize the following objective function:

$$\mathcal{L} = \mathcal{L}_d + \mathcal{L}_c$$

where $\mathcal{L}_d$, the discriminative loss function, is defined as $$\mathcal{L}_d = \frac{1}{K}\sum \gamma L_{mk} + (1-\gamma)L_u$$

where K is the number of masked CNNs (and k is the index of masks/masked CNNs), $L_{mk}$ corresponding to a discriminative loss term for each masked CNN, $L_u$ corresponding to a discriminative loss term for the unmasked CNN, and γ is a hyperparameter between 0 and 1;

and where $\mathcal{L}_c$, the compositional loss, is defined as $$\mathcal{L}_c = \frac{1}{K}\sum_k\sum_n \lambda_n \|\phi_{m_k,n} - \phi_{u,n}m'_k\|_2^2$$

where n is a layer index, $\lambda_n$ is a layer-specific hyperparameter, $\phi_{m_k,n}$ is the activation of the kth masked CNN (corresponding to object mask $m_k$) at layer n, $\phi_{u,n}$ is the activation of the unmasked CNN at layer n and $m'_k$ is the penalty mask of the unmasked CNN corresponding to the object mask $m_k$. Additionally or alternatively, the masked/unmasked CNNs may be trained in any manner that increases CNN compositionality. Note that the discriminative loss functions may be instantiated as softmax-cross entropy for joint class prediction or sigmoid-cross entropy for independent class prediction (or in any other manner).

The methods of the preferred embodiment and variations thereof can be embodied and/or implemented at least in part as a machine configured to receive a computer-readable medium storing computer-readable instructions. The instructions are preferably executed by computer-executable components preferably integrated with a convolutional neural network operating on a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for teaching compositionality to convolutional neural networks, comprising:
    an unmasked convolutional neural network comprising a first set of convolutional neural network layers; wherein input to the unmasked convolutional neural network is maskless;
    a first masked convolutional neural network comprising a second set of convolutional neural network layers; wherein input to the first masked convolutional neural network is masked by a first object mask; wherein the unmasked convolutional neural network and the first masked convolutional network share convolutional neural network weights; wherein the first object mask suppresses activation outside of a region of a first object;
    a second masked convolutional neural network comprising a third set of convolutional neural network layers; wherein input to the second masked convolutional neural network is masked by a second object mask; wherein the unmasked convolutional neural network and the second masked convolutional network share convolutional neural network weights; wherein the second object mask suppresses activation outside of a region of a second object;
    wherein the system trains the unmasked, first, and second masked convolutional neural networks simultaneously based on an objective function that seeks to reduce both discriminative loss and compositional loss.

2. The system of claim 1, further comprising a first penalty mask, corresponding to the first object mask, that operates on output of one of the first set of convolutional neural network layers; wherein output of the first penalty mask is used to calculate compositional loss.

3. The system of claim 2, wherein the first penalty mask is identical in function to the first object mask.

4. The system of claim 2, wherein the first penalty mask is distinct in function to the first object mask; wherein the first penalty mask suppresses activation only in regions corresponding to any object mask other than the first object mask.

5. The system of claim 2, further comprising a second penalty mask, corresponding to the second object mask, that operates on output of the one of the first set of convolutional neural network layers; wherein output of the second penalty mask is also used to calculate compositional loss.

6. The system of claim 5, wherein the first penalty mask suppresses activation in regions corresponding to the second object mask; wherein the second penalty mask suppresses activation in regions corresponding to the first object mask.

7. The system of claim 6, wherein the first penalty mask is identical in function to the first object mask; wherein the second penalty mask is identical in function to the second object mask.

8. The system of claim 7, further comprising a third object mask, identical in function to the first object mask, located between two of the second set of convolutional neural network layers.

9. The system of claim 1, wherein the system trains the unmasked and first masked convolutional neural networks simultaneously based on the objective function.

10. The system of claim 9, wherein the system trains the unmasked, first masked, and second masked convolutional neural networks simultaneously.

11. The system of claim 9, wherein the objective function models compositional loss as a sum of least square differences across activation outputs of the second set of convolutional neural network layers and a product of activation outputs of the second set of convolutional neural network layers and the first penalty mask.

12. The system of claim 9, wherein the objective function models discriminative loss using softmax-cross entropy or using sigmoid-cross entropy for joint class prediction.

13. The system of claim 1, wherein the unmasked and first masked convolutional neural network are trained to receive data feature input by setting activation of child feature nodes according to image features of an image; wherein the inferred output includes a classification of the image.

14. A method for teaching compositionality to convolutional neural networks, comprising:
    receiving an initial masked CNN structure, the structure comprising:
    an unmasked convolutional neural network comprising a first set of convolutional neural network layers; and
        a first masked convolutional neural network comprising a second set of convolutional neural network layers; wherein input to the first masked convolutional neural network is masked by a first object mask; wherein the unmasked convolutional neural network and the first masked convolutional network share convolutional neural network weights; wherein the first object mask suppresses activation outside of a region of a first object;
        a second masked convolutional neural network comprising a third set of convolutional neural network layers; wherein input to the second masked convolutional neural network is masked by a second object mask; wherein the unmasked convolutional neural network and the second masked convolutional network share convolutional neural network weights; wherein the second object mask suppresses activation outside of a region of a second object;

receiving a training dataset; and learning convolutional neural network weights; wherein learning convolutional neural network weights comprises training the unmasked and first masked convolutional neural networks simultaneously on the training dataset based on an objective function that seeks to reduce both discriminative loss and compositional loss.

15. The method of claim 14, wherein learning convolutional neural network weights comprises training the unmasked, first masked, and second masked convolutional neural networks simultaneously on the training dataset.

16. The method of claim 14, wherein receiving the initial masked CNN structure further comprises receiving a first penalty mask, corresponding to the first object mask, that operates on output of one of the first set of convolutional neural network layers; wherein output of the first penalty mask is used to calculate compositional loss.

17. The method of claim 16, wherein the first penalty mask is identical in function to the first object mask.

18. The method of claim 16, wherein the first penalty mask is distinct in function to the first object mask; wherein the first penalty mask suppresses activation only in regions corresponding to any object mask other than the first object mask.

19. The method of claim 16, wherein receiving the initial masked CNN structure further comprises receiving a second penalty mask, corresponding to the second object mask, that operates on output of the one of the first set of convolutional neural network layers; wherein output of the second penalty mask is also used to calculate compositional loss.

20. The method of claim 19, wherein the first penalty mask suppresses activation in regions corresponding to the second object mask; wherein the second penalty mask suppresses activation in regions corresponding to the first object mask.

* * * * *